(12) United States Patent
Teleki

(10) Patent No.: US 10,706,982 B2
(45) Date of Patent: Jul. 7, 2020

(54) COMBINED MODERATOR/TARGET FOR NEUTRON ACTIVATION PROCESS

(71) Applicant: Péter Teleki, Dunaújváros (HU)

(72) Inventor: Péter Teleki, Dunaújváros (HU)

( * ) Notice: Subject to any disclaimer, the term of this patent is extended or adjusted under 35 U.S.C. 154(b) by 539 days.

(21) Appl. No.: 14/647,027

(22) PCT Filed: Nov. 25, 2013

(86) PCT No.: PCT/HU2013/000112
§ 371 (c)(1),
(2) Date: May 22, 2015

(87) PCT Pub. No.: WO2014/080238
PCT Pub. Date: May 30, 2014

(65) Prior Publication Data
US 2015/0302944 A1 Oct. 22, 2015

(30) Foreign Application Priority Data

Nov. 23, 2012 (WO) ................ PCT/HU2012/000127

(51) Int. Cl.
*G21G 1/06* (2006.01)
*H05H 6/00* (2006.01)
*H05H 3/06* (2006.01)

(52) U.S. Cl.
CPC ............... *G21G 1/06* (2013.01); *H05H 3/06* (2013.01); *H05H 6/00* (2013.01)

(58) Field of Classification Search
USPC ................................................ 376/156–169
See application file for complete search history.

(56) References Cited

U.S. PATENT DOCUMENTS

| | | |
|---|---|---|
| 3,019,996 A | 2/1962 | Van Deusen |
| 4,599,515 A | 7/1986 | Whittemore |
| 5,539,788 A | 7/1996 | Ruddy |
| 6,472,677 B1 * | 10/2002 | Rodriguez ............... G21G 1/10 |
| | | 250/222.2 |
| 2008/0315109 A1 | 12/2008 | Stephan |

(Continued)

FOREIGN PATENT DOCUMENTS

| | | |
|---|---|---|
| CN | 2145494 | 11/1993 |
| CN | 2831689 | 10/2006 |
| EP | 0 791 221 A1 | 8/1997 |

(Continued)

OTHER PUBLICATIONS

Macklin et al., "Neutron-Capture Cross Sections of the Tungsten Isotopes 182W, 183W, 184W, and 186W from 2.6 to 2000 keV," Apr. 1982.*

(Continued)

*Primary Examiner* — Marshall P O'Connor
(74) *Attorney, Agent, or Firm* — Fitch, Even, Tabin & Flannery LLP

(57) ABSTRACT

The present invention relates to combined moderator/target structures that significantly increase the initial energy spectrum of neutrons generated in a nuclear reactor within the thermal range of said spectrum. Said combined moderator/target structures can be applied in all cases, wherein the neutron-capture cross-section of the target—or a certain isotope therein—is at least 2.0 barn for thermal neutrons.

13 Claims, 1 Drawing Sheet

(56) References Cited

U.S. PATENT DOCUMENTS

2012/0121053 A1* 5/2012 Schenter ............... G21G 1/001
　　　　　　　　　　　　　　　　　　　　376/158

FOREIGN PATENT DOCUMENTS

RU　　　　2102775　　　1/1998
WO　　2008/060663 A2　　5/2008

OTHER PUBLICATIONS

PCT International Search Report of the International Searching Authority dated Jun. 26, 2014 for International Application No. PCT/HU2013/000112, 3 pages.
PCT International Preliminary Report on Patentability of the International Preliminary Examining Authority dated Dec. 11, 2014 for International Application No. PCT/HU2013/000112, 10 pages.
Search Report for CN Application No. 2013800711219; 1 page.

* cited by examiner

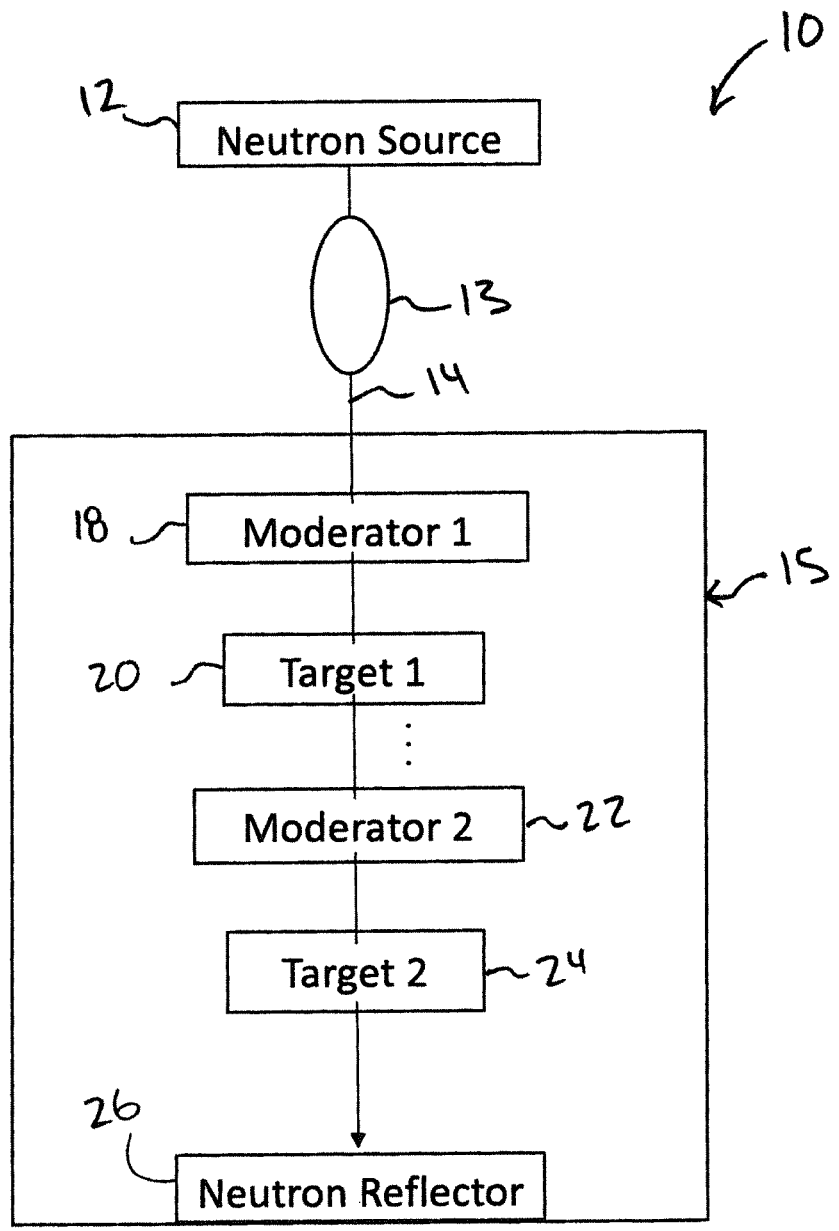

COMBINED MODERATOR/TARGET FOR NEUTRON ACTIVATION PROCESS

CROSS-REFERENCE TO RELATED APPLICATIONS

This application is a U.S. national phase application filed under 35 U.S.C. § 371 of International Application PCT/HU2013/000112, filed Nov. 25, 2013, designating the United States, which claims benefit of International Application PCT/HU2012/000127, filed Nov. 23, 2012, which are all hereby incorporated herein by reference in their entirety.

FIELD

The present invention relates to combined moderator/target structures that can be utilized in neutron activation processes.

BACKGROUND

The initial energy spectrum of neutrons generated by a neutron source, e.g. a neutron generator or a (thermal) nuclear reactor, which is generally characteristic of said neutron source, is well known. It is common to divide the domains of various energy of the spectrum of neutrons exiting the active core of a nuclear reactor into a thermal range (from 1 meV to 1 eV), an intermedier range (from 1 eV to 100 keV) and a fast neutron range (from 0.1 MeV to 15 MeV), wherein the range from 0.1 MeV to 1.0 MeV is also called epithermal range, while neutrons having a mean energy of about 2.0 MeV are the so-called pile neutrons. Here, and from now on, if it is not stated differently, the term "activation" always refers to activations taking place in the thermal range. In the thermal range, activations take place primarily through the (n, γ) reaction, but (n, p) reactions also appear in this range to a small extent. Moreover, in this energy range, in case of $D_2$ and Be, the (γ, n) reactions, while for Li and Be, the (n, α) reactions also play some role. The (n, f) fission processes will be discussed later. Furthermore, in the intermedier range so-called "resonances" can arise that might also contribute to a small extent to the activation of a target. In case of pile and fast neutrons, the (n, γ) reaction is not a characteristic reaction type and/or further nuclear reactions, for example the (n, 2n) reactions, due to their small efficiency, cannot be utilized on the industrial scale.

At present, neutron activation processes are well known, they are applied in many fields, see e.g. the field of isotope production for various diagnostic purposes. In particular, such solutions are disclosed e.g. by EP Patent No. 0,791,221 B1 and International Publication Pamphlet No. WO2008/060663 A2.

SUMMARY

A primary object of the present invention is to enhance the efficiency of neutron activation processes via utilizing the neutrons used for the irradiation as effectively as is possible.

BRIEF DESCRIPTION OF THE DRAWINGS

FIG. 1 is a schematic diagram of a system for enhancing the efficiency of neutron activation processes.

BRIEF DESCRIPTION

During neutron activation, the substance (that is, the target) to be activated (and hence, to be converted/transmutated through various decay schemes) by means of a neutron irradiation is subjected to a neutron flux with a given energy spectrum from a neutron source (e.g. from the active core of a nuclear reactor or a neutron generator), wherein said energy spectrum is characteristic of the source made use of. The initial neutron spectrum reaching the target is affected by the materials located between said neutron source and the target along the propagation path of neutrons. If, e.g. the neutrons travel towards the target in the horizontal channel of a reactor, various beam locks and thermalizing filters can be arranged in the intermediate space. The same applies if the target is arranged outside of the reactor wall, in e.g. a cartridge (container); in such a case, the reactor wall itself forms part of the intermediate space.

Our studies have revealed that it is preferable to tune the energy spectrum of the neutrons that enter the target or to shift said spectrum in energy in such a way that the thermal neutron flux be as large as possible and preferably be close to the maximum.

Moreover, we have come to the conclusion that to enhance effectivity of the activation process and to increase the transmutation yield, it is preferable to form the target and the moderator as a single unit, that is, in the form of a combined target/moderator structure, in such a way that during the activation the moderator is arranged at least partially in the target, i.e. in its bulk volume along the propagation direction of the neutron flux. In particular, the moderator is incorporated/inserted at that point of the target, where the thermal neutrons of the initial neutron flux had already been absorbed in the target to a significant extent, preferably at least in 70%, more preferably at least in 80%, yet more preferably at least in 90%, and most preferably at least in 95% along their way propagating through said target and, thus, activated the irradiated portion of the target. The moderator arranged at this point of the target is preferably provided by a moderator that thermalizes the intermedier (epithermal) range of the initial neutron flux entering said target and, thus, increases the neutron thermal utilization factor. A further target or another combined target/moderator structure can be arranged along the propagation direction of neutrons after (or downstream of) the portion of the moderator that generates thermalized intermedier (epithermal) neutrons; in the latter case, similarly, the moderator incorporated serves to thermalize the residual fast neutrons. That is, by arranging target slices and moderators consecutively in an alternating manner in the target, the initial neutron spectrum gets shifted into the thermal range in energy up to about 70 to 95%, more preferably up to about 80 to 95%, as a consequence of which the total thermal neutron flux provided by the initial neutron spectrum can almost be doubled.

The thermal neutrons in the initial irradiating neutron flux can be absorbed by the target (theoretically) up to 100%, however, the application of a target slice with a section thickness smaller than the above total thermal absorption length can also be preferred for some elements (in case of e.g. Sm: 2.0 cm; W: 10.0 cm; Re: 4.0 cm) in the propagation path of the incident neutron flux.

The length of a single thermal absorption zone for the respective elements (i.e. the specific absorption thickness in the target) can be determined on the basis of radiation physical considerations. The studies performed by us have revealed that the intermedier absorption zone starts to form at a material depth of about 1.5 cm for each natural element (i.e. not only for the exemplary elements of Sm, W and Re) if the (thermal) neutron-capture cross-sections fall into the range of about 15 to 18000 barn, or preferably into the range of about 20 to 6000 barn. Moreover, fast neutrons—in a minimal amount—also start to slow down at the same depth of about 1.5 cm.

That is, a significant branching point (section) appears in the absorption, slowing down zones of both the thermal and the intermedier, as well as the fast neutrons in the target at a depth of about 1.5 cm from the irradiation front (assuming that the thermal cross-section falls into the range of 15 to 8000 barn).

Specifically, the thermal absorption length in an Sm target, in a W target and in a Re target is 1.5 to 2.5 cm, 1.5 to 15.0 cm and 1.5 to 5.0 cm, respectively.

If the intermedier zone (i.e. the energy range of 1 eV to 100 keV) is thermalized, the thus obtained thermal neutron flux may be less than the thermal portion of the initial spectrum, since, in general, the intermedier neutron flux is smaller than the thermal one. This, however, does not basically change the above results. According to the invention, the intermedier moderator (here, and from now on referred to as mod.i.) is a moderator that is arranged in the target, i.e. within its bulk volume. The total thickness of the target can be divided into slices, around which moderators can be placed; to this end, the absorption lengths for neutrons of various kinds/energies that can be either measured or determined/estimated through theoretical calculations are also taken into account. Staying with this concept, a moderator thermalizing neutrons from different energy ranges of the initial neutron spectrum can be arranged between the individual target slices each having a certain thickness determined as is discussed above. For example, besides the intermedier moderator, an epithermal (ranging from 0.1 MeV to 1.0 MeV) moderator (from now on referred to as mod.e.) can also be utilized, even in the form of being integrated with said intermedier moderator (from now on referred to as mod.i.+e.). It is essential, that in case of thermalizing the intermedier and/or the epithermal range, the combined flux does clearly not decrease, but the neutron spectrum shifts in energy towards lower neutron energies. (The fast neutron flux decreases, and minority of the fast neutrons changes into the intermedier/epithermal state.)

Similarly, the fast neutrons (with energies falling into the range of 1.0 MeV to 15.0 MeV) can be thermalized by one, but at most by two moderators (from now on referred to as mod.f.) according to the present invention.

In view of the above, the so-called internal moderators arranged in the target along the propagation direction of the initial neutron flux incident when activation is performed can be provided with the following types of moderators:
  an intermedier moderator (mod.i.);
  an epithermal moderator (mod.e.);
  optionally, a combination of the previous two ones, preferably in the form of a single unit (mod.i.+e.); and
  a fast neutron moderator (mod.f.).

The total length (i.e. material thickness) of said moderators in paraffin and/or in polyethylene (PE) preferably ranges from 40 to 50 cm. Taking the neutron scattering and the collision coefficient characteristic of the chemical element of the target into account, this length is (might be) decreased by the thickness of the target.

Said internal moderators increase the irradiation length, which means that due to the increased irradiation source/target distance, a decrease in neutron flux arises in those regions of said target that are located farther off from the neutron source.

According to the present invention, preferably at least one internal moderator (e.g. the type mod.i.+e.) is applied within the target, preferentially between two target slices; thereby, the activation yield is enhanced. In the optimal case, for the above mentioned elements, the thickness of the target—i.e. the production batch—can be doubled in this way compared to the initial quantities, that is, it can be increased e.g. in case of Sm from 2.5 cm to 5.0 cm, in case of W from 15.0 cm to 30 cm, and in case of Re from 5.0 cm to 10.0 cm.

Preferably, all materials (e.g. the reactor wall, water, shutters, filters, etc.) located on the front side of the target (i.e. at the point where the initial neutron flux enters the target) between the target and the radiation source—facing the neutron source—forms a thermal moderator (from now on referred to as mod.t.) that can be considered, in harmony with the above, as a so-called external moderator. This external moderator comprises all materials arranged between the neutron source and the target that transform the initial neutron spectrum partially. If the thermal neutron flux can still be increased, said external moderator can be completed with a real moderator that is arranged in front of the front side of the target. To this end, preferably a graphite layer can be recommended that has a thickness of preferably several cm's, more preferably about 5 cm.

Preferably, a neutron backscatter (albedo) neutron reflector (from now on referred to as mod.m.) can be used on the back side of the target (i.e. at those portion of the target that is located farthest from the neutron source along the propagation direction of the neutron flux and serves as an exit surface for the neutrons propagating within the target to leave said target). The optimal thickness of the neutron reflector mod.m. corresponds to the diffusion length of the respective element mod.m. (for example, said thickness is 50.2 cm for C, and at least 10.0 cm, preferably 30.0 cm for BeO). It is also preferred if said neutron reflector mod.m. is arranged not only on the back side of the target, but on the side walls—except the front side—of the container as well, since the neutrons exiting from the reactor travel towards the target not only along a perpendicular direction.

Moreover, it is also preferred if each moderator is arranged separately in a cassette (or in the case of experimental reactors, is canned separately, because in this way said moderators can be easily placed and, optionally, handled in an automated manner (by means of e.g. robotized loader units)). Furthermore, it is also preferred to divide the target into several slices that can be canned separately one-by-one in order that the internal moderators could be easily inserted into between the target slices. That is, it is preferable to can both the target substance and the moderators. It is also preferable if the thus obtained cassettes can be arranged in a common storage container that allows for the separate take-out and removal of the individual target cassettes from said container. Therefore, in light of the above discussed principles, the combined target/moderator structure can be realized in some exemplary embodiments with basic cross-sections (a) to (d) along the propagation direction of the irradiating neutron flux, that is, from top to bottom in Table 1 given below.

TABLE 1

| neutron source (e.g. reaction zone of a nuclear reactor) | | | |
| --- | --- | --- | --- |
| (a) | (b) | (c) | (d) |
| mod.t. | mod.t. | mod.t. | mod.t. |
| target | target | target | target |
| mod.i. | mod.i. + e. | mod.i. | mod.i. |
| target | target | target | target |
| mod.e. | mod.f. | mod.e. | mod.f. |
| target | target | target | target |

TABLE 1-continued neutron source (e.g. reaction zone of a nuclear reactor)

| (a) | (b) | (c) | (d) |
|---|---|---|---|
| mod.f.<br>target<br>mod.m. | mod.m. | mod.f.<br>target | |

As it was already mentioned, the above discussed internal moderators (moderators within the target), that can be canned or arranged in cassettes, are useful if the thermal neutron-capture cross-section of the target is at least 15 barn. There is no upper limit for this, however, the length of a Gd target (cross-section is 49700 barn) is about 0.5 cm (while for the other elements the length is about 1.5 cm), which is exceptional. It is obvious that there is no use to divide the target into slices by internal moderators if the neutron-capture cross-section is less than the minimum of 15 barn. In such cases, a solution can be to mix the target with moderator along its full length, wherein both the target and the moderator are preferably prepared as powders. Considering the fact that, in general, most chemical elements are inflammable in powdery form, it is preferred if the target is present in carbidated, nitridated, oxidated, silicidated state; the carbide and the oxide states are especially preferred as these are excellent moderators. Apparently, the boridated form is disadvantageous due to the high neutron-capture cross-section of boron (B). The fluoride, sulphide and chloride states should also be avoided, but are not forbidden. According to a yet further embodiment, if e.g. the target is not in the carbide and/or oxide state, it can be provided in the form of a mixture prepared with water, paraffin, etc. Said target in its mixture prepared with water, paraffin, etc. can also be oxidized.

If the powder mixture constituting the target/modulator structure according to the invention is formed long (thick) enough, the desired activation process will take place at first over a thermal section in the target/moderator mixture concerned, the location of which is rather difficult to be predicted in advance. This section is followed by an inactive section, wherein the intermedier and/or epithermal neutrons get thermalized, and then the same repeats with fast neutrons as well. Thus, in a sufficiently long target/modulator powder mixture structure, there is an inactive section on the front side which is followed by two or three active/inactive sections. Naturally, in a possible further embodiment it can also happen that said front side begins with an active section.

Referring to FIG. 1, there is illustrated an example system 10 for enhancing the efficiency of neutron activation processes. The system 10 has a neutron source 12, such as an active core of a nuclear reactor or a neutron generator. The neutron source 12 emits a neutron flux 14 of a given energy spectrum, wherein said energy spectrum is characteristic of the source made use of. The neutron flux 14 propagates through and is affected by fissile material 13 located between the neutron source 12 and a combined moderator/target unit 15, such as a container. The container 15 houses moderators 18,22 and targets 20,24. The moderators 18,22 and targets 20,24 are arranged in an alternating manner along the direction of propagation of the neutron flux 14. In a preferred embodiment, the moderators 18,22 and targets 20,24 are separately put into cans or cassettes. The moderators 18,22 are made of a substance that shifts the energy of at least a portion of the incident neutrons of the neutron flux 14 emitted by the neutron source 12. More specifically, each moderator 18,22 shifts the respective neutron energy into the thermal energy range so as to maximize the number of thermal neutrons for activation. The neutron flux 14 ultimately passes through the sequence of moderators 18,22 and targets 20,24 and reaches a neutron backscatter (albedo) neutron reflector 26, which may be arranged along the propagation direction of the neutron flux 14 at the back side of the container 15. The neutron reflector 26 may serve as an exit surface for the neutrons propagating through the container 15. In another example, the neutron reflector 26 may also be arranged on the side walls of the container 15 (though not the front wall), since the neutron flux 14 exiting from the reactor source 12 not only travels along the direction perpendicular to the reactor source 12.

The above target/modulator powder mixture structure is basically in harmony with the inventive concept of "moderator(s) arranged in the target". However, it is less efficient than the previously discussed combination of target/moderator slices that can be canned or arranged in separate cassettes. For the industrial applications, the technologies based on the inventive target/moderator structures are limited by prescribing a lower limit of 2.0 barn for the cross-section of the target. According to this, in particular, at least one transmutable isotope of the transmutable parent element (i.e. the target) shall have a neutron-capture cross-section of minimum 2.0 barn for thermal neutrons.

A further aspect of the present invention is the application of the above structures for the conversion of elements, that is, to transmutate via neutron activation. The purpose of said transmutation might be the preparation of a certain isotope; in such a case, it is sufficient to take merely the appropriate isotopes of the target (i.e. the parent element) into account. To demonstrate the operational capacity of the present inventive solution, under laboratory conditions a neutron flux of at least $1*10^8$ n/cm$^2$/s is required with about 45%±5% thermal neutron proportion in the neutron spectrum. In case of power reactors, the neutron flux that can be withdrawn through the outer walls of the reactor is at least $1*10^{14}$ n/cm$^2$/s for cassette/container systems.

According to the inventive concept, the above neutron flux can be thermalized to the extent of about 70% to 95%, more preferably about 80% to 95%. Hence, the flux of $1*10^{14}$ n/cm$^2$/s is practically a thermal neutron flux. It is thought that the target/moderator powder mixture structure is more preferred for a target with neutron-capture cross-section of 2.0 to 20.0 barn, while above 20.0 barn the combined target/moderator structure, optionally arranged in cassettes, becomes more preferable. It is also thought that the active surface (i.e. that can be subjected to irradiation) of a cassette is 1 m$^2$ (or 10 000 cm$^2$), however, at least 1000 cm$^2$, and at least one cassette can be arranged per reactors. Moreover, it is thought that—in practice—at least two cassettes (containers) with an active surface of 1 m$^2$ each can be arranged in every reactors in the propagation path of the neutron flux leaving the active core. A total thickness of the target is at least 2.0 cm.

As thermalizing filters, materials of high hydrogen content (e.g. $H_2O$, $D_2O$, paraffin, polyethylene, reactor grade graphite, etc.) are used, however, the materials of the intermedier space and the material of the target itself have to be taken into consideration from the aspect of thermalizing (or decelerating) of neutrons. According to the requirements set towards said thermalizing filters (or moderators), the thermal neutron capture cross-sections of such materials should be low, while the thermal neutron scattering cross-sections (considering the elastic and inelastic scatterings separately) thereof should be high. Moreover, the collision coefficients for these materials should be as low as possible in collision neutron thermalization processes.

In case of elements of high atomic number (for example, Pb, Bi), the moderators can also screen the gamma radiation of the radiation source. In Table 2 below, the moderators are summarized that can be preferably used with the inventive solutions; the atomic numbers are given in front of the chemical symbols of the elements and, in case of need, i.e. if various isotopes of a certain element can be equally utilized, the mass numbers are also specified behind the chemical symbol. Table 2 also contains the neutron-capture cross-section values for thermal neutrons (expressed in barn units) of the elements for those processes which can be considered preferential as to the present invention, that is, for the processes of elastic scattering (coh), inelastic scattering (inc) and capture (abs). The numerical data collected in Table 2 can be found e.g. in various textbooks; in this respect the reader is referred to the following publications:

Neutron Cross Section—Brookheaven National Laboratory, 2nd edition 1958;

S. F Mughabghab et al. Neutron Cross Section: Neutron Resonance Parameters and Thermal Cross Section v.1 (Neutron Cross sections Series) (Vol1)—Saunders College Publishing;

Nuclear Fission and Neutron-included Fission Cross-section (Neutron physics and nuclear data in science and technology), Pergamon Press 1981;

Atlas of Neutron Resonances, 5th edition: Resonance Parameters and Thermal Cross Sections. Z=1-100 S. F. Muahababab. Elsevier Science (5th edition 2006).

TABLE 2

| | coh (barn) | inc (barn) | abs (barn) | N |
|---|---|---|---|---|
| 1H | 1.7568 | 80.26 | 0.3326 | 1. |
| 2He | 1.34 | 0.0000 | 0.0074 | 2. |
| 4Be | 7.63 | 0.0018 | 0.0076 | 3. |
| 6C | 5.551 | 0.001 | 0.0035 | 4. |
| 8O | 4.232 | 0.0000 | 0.0002 | 5. |
| 12Mg | 3.631 | 0.08 | 0.063 | 6. |
| 13Al | 1.495 | 0.0082 | 0.231 | 7. |
| 14Si | 2.1633 | 0.004 | 0.171 | 8. |
| 20Ca | 2.78 | 0.05 | 0.43 | 9. |
| 37Rb | 6.32 | 0.5 | 0.38 | 10. |
| 40Zr | 6.44 | 0.02 | 0.185 | 11. |
| 50Sn | 4.871 | 0.022 | 0.626 | 12. |
| 82Pb | 11.115 | 0.0030 | 0.171 | 13. |
| 83Bi | 9.148 | 0.0084 | 0.0338 | 14. |
| $n^0$ | 43.01 | 0 | 0 | |
| 26Fe | 11.22 | 0.40 | 2.56 | |

The enlisted chemical elements can also be provided in the form of compounds, alloys; in particular, hydrogen (H) is highly explosive alone, and thus it is expedient to use it in the oxide forms, i.e. as $H_2O$, $D_2O_3$. Some further examples are also provided hereby: Be, BeO; C, $CO_2$; Mg, MgO; Al, $Al_2O_3$; Si, SiO, $SiO_2$, SiC; Zr, $ZrO_2$ (+5% CaO stabilizer); roses metal Bi50/Pb28/Sn22 (volume density: 9.85 g/cm³, melting temperature: 95° C., remark: the usage of Sn alone is disadvantageous due to its cold-brittleness; see "tin plague"); Pb, PbO; Bi, $Bi_2O_3$.

Considering the fact that the oxides and/or carbides of moderator substances are preferential, Table 3 below summarizes the possible oxides and carbides of the above mentioned moderator substances; here, the volume density D (expressed generally in units of g/cm³ and for gases in units of kg/m³), the melting point $T_{MP}$ (in units of ° C.) and the boiling point $T_{BP}$ (in units of ° C.) of these compounds are also specified.

TABLE 3

| | Z | | |
|---|---|---|---|
| | D (g/cm³) *(kg/m³) | $T_{MP}$ (C. °) | $T_{BP}$ (C. °) |
| 1. | 0.07 | −259.3 | −252.8 |
| 2. | 0.12 | | −268.9 |
| 3. | 1.85 | 1287.0 | 2471.0 |
| 4. | ≈2.25 | 3650.0 | 5000.0 |
| 5. | 1.14 | −218.8 | −182.9 |
| 6. | 1.74 | 650.0 | 1090.0 |
| 7. | 2.70 | 660.3 | 2519.0 |
| 8. | 2.33 | 1414.0 | 3265.0 |
| 9. | 1.55 | 842.0 | 1484.0 |
| 10. | 1.53 | 39.3 | 688.0 |
| 11. | 6.50 | 1855.0 | 4409.0 |
| 12. | 7.31 | 231.9 | 2602.0 |
| 13. | 11.35 | 327.4 | 1749.0 |
| 14. | 9.74 | 271.4 | 1564.0 |
| 15. | 1.00 | 0.0 | 100.0 |
| 16. | 3.10 | 2530.0 | |
| 17. | 1.97 | | −78.5 |
| 18. | 3.58 | 2800.0 | 3600.0 |
| 19. | 3.97 | 2045.0 | 2980.0 |
| 20. | 2.20 | 1983.0 | 2230.0 |
| 21. | 2.10 | 1702.0 | 1880.0 |
| 22. | 3.30 | 2580.0 | |
| 23. | 5.60 | 2687.0 | ≈5000.0 |
| 24. | 6.90 | 1400.0 | |
| 25. | 9.50 | 890.0 | |
| 26. | 8.90 | 825.0 | 1890.0 |
| 27. | 3.70 | 1400.0 | |
| 28. | 3.20 | 2700.0 | |
| 29. | 6.51 | 3530.0 | 5100.0 |

The already mentioned paraffin, polyethylene (PE), as well as other plastics, e.g. polycarbonates (volume density: about 1.2 g/cm³, operation temperature: at most 115° C.), polyimides (PI; volume density: about 1.4 g/cm³, operation temperature: at most 250° C.), e.g. kapton, polytetrafluoroethylene (PTFE; operation temperature: at most 180° C.), e.g. Teflon can also be used preferably as a moderator medium. For environmental protection reasons the latter is, however, not preferred due to its fluorine content. These materials, except PI, are not radiation resistant. The minimum of PE's operation temperature is quite low, only 50° C. Here, and from now on, the term "operation temperature" of a material refers to a temperature value at which said material is utilized in the inventive neutron activation process.

It is a specific case, if a separated isotope of a natural element is used as moderator; for this, Table 4 below gives some examples; here, the proportion (expressed in mass %) of the isotope concerned is also indicated (compared to the natural components).

TABLE 4

| | % | coh (barn) | inc (barn) | abs (barn) |
|---|---|---|---|---|
| 1$D_2$ | 0.0149 | 5.592 | 7.64 | 0.00005 |
| 2He 4 | 99.9998 | 1.34 | 1.34 | 0. |
| 3Li 7 | 92.58 | 0.619 | 1.40 | 0.0454 |
| 5B 11 | 80.20 | 5.56 | 5.77 | 0.0055 |
| 7N 15 | 0.365 | 5.21 | 0.0000 | 0.0000 |
| 82Pb 208 | 52.3 | 11.34 | 0. | 0.0005 |

It is here noted that the oxide, carbide and nitride compounds of the various isotopes listed in Table 4 (either alone or mixed with the parent element), e.g. $D_2O$, $Li_2O$, $B_4C$, BN, PbO, are also preferred.

It was already mentioned that it is preferred if the neutrons slow down to thermal level in the target and/or the moderator via as few collisions as possible. Table 5 below summarizes the collision coefficients for pile neutrons with the initial energy of 2.0 MeV for a couple of moderator materials in case of slowing down to a thermal energy level (0.025 MeV).

TABLE 5

| 1H: 18;    | 2He: 43;    | 3Li7: 67;   |
| 4Be: 86;   | 5B11: 105;  | 6C: 114;    |
| 7N15: 132; | 8O: 150;    | 12Mg: 222;  |
| 13Al: 240; | 14Si: 261;  | 20Cα: 380;  |
| 37Rb: 740; | 40Zr: 800;  | 50Sn: 1050; |
| 82Pb: 1804;| 83Bi: 1826  |             |
| Water: 19; | 26Fe: 552;  | 92U: 2172   |

All materials arranged between the neutron source and the target function as moderator, thus the moderator might contain such materials (elements) by means of which the initial neutron spectrum considered just before its entrance into the target and to be used for the final activation can be made more preferable.

This moderator is, hence, located on the front side of the target and functions actually as a thermalizing filter that can be realized by the combination of various elements, e.g. Fe, water, Al, Pb, Bi.

For example, in case of Sm, W and Re the following can be stated: the thicknesses of material needed for the total absorption of thermal neutrons are 2.5 cm, 15.0 cm and 5.0 cm in Sm, W and Re, respectively. At these thicknesses, the thermal part of the spectrum has already been absorbed, and due to the neutron collisions and scatterings in the target, the intermedier (plus the epithermal) range and the fast neutron range become distorted and the flux intensity decreases, too.

In what follows, some important radiation physical characteristics of the exemplary chemical elements to be transmutated (converted) by the inventive transmutation process will be discussed in detail. The examples are numbered in each table, wherein the target (parent element)→product (daughter element) conversion is denoted by "→". The atomic number of the related chemical element is provided in front of the designation of the element concerned, while the mass number(s) of its isotope(s) is(are) provided after the designation. The neutron-capture cross-section for thermal neutrons, expressed in units of barn, for the corresponding target (parent element) and its transmutable isotopes is also provided along with the same data for the daughter element(s) created.

The second and third daughter elements can appear in the conversion process of a parent element/daughter element as well. In what follows, the formation of the desired product (i.e. daughter element) is accentuated in the process, other formations are only recorded. The abundance (expressed in units of mass %) of the transmutable/transmutated isotopes of the parent element/daughter element is also specified in the corresponding tables.

At first, a general table (see Table 6, below) is provided that contains all the chemical elements of atomic number Z, one after the other in a numbered way, that can be transmutated according to the present invention; the table also contains the corresponding isotopes of the parent and daughter elements of mass number A, as well as the related neutron-capture cross-section data expressed in units of (b)arns.

TABLE 6

|     | Z %     | A   | b     |   | Z %    | A   | b    |
| --- | ------- | --- | ----- | - | ------ | --- | ---- |
| 1.  | 23V     |     | 3.0   | → | 24Cr   |     |      |
|     | 0.25%   | 50  | 60.0  |   |        |     |      |
|     | 99.75%  | 51  | 4.9   |   | 83.76% | 52  | 0.7  |
| 2.  | 25Mn    |     | 13.3  | → | 26Fe   |     |      |
|     | 100.00% | 55  | 13.3  |   | 91.66% | 56  | 2.6  |
| 3.  | 31Ga    |     | 2.7   | → | 27Ge   |     |      |
|     | 60.40%  | 69  | 2.2   |   | 20.52% | 70  | 3.0  |
|     | 39.60%  | 71  | 3.6   |   | 27.43% | 72  | 0.8  |
| 4.  | 33As    |     | 4.5   | → | 34Se   |     |      |
|     | 100.00% | 75  | 4.5   |   | 9.02%  | 76  | 85.0 |
| 5.  | 35Br    |     | 6.9   | → | 36Kr   |     |      |
|     | 50.53%  | 79  | 11.0  |   | 2.27%  | 80  | 11.8 |
|     | 49.47%  | 81  | 2.7   |   | 11.56% | 82  | 29.0 |
| 6.  | 45Rh    |     | 144.8 | → | 46Pd   |     |      |
|     | 100.00% | 103 | 144.8 |   | 10.97% | 104 | 0.6  |
| 7.  | 47Ag    |     | 63.3  | → | 48Cd   |     |      |
|     | 51.35%  | 107 | 37.6  |   | 0.88%  | 108 | 1.1  |
|     | 48.65%  | 109 | 91.0  |   | 12.39% | 110 | 11.0 |
|     |         |     |       |   | +46Pd  | 108 | 8.5  |
| 8.  | 51Sb    |     | 4.9   | → | 52Te   |     |      |
|     | 57.25%  | 121 | 5.7   |   | 2.46%  | 122 | 3.4  |
|     | 42.75%  | 123 | 3.8   |   | 4.61%  | 124 | 6.8  |
|     |         |     |       |   | +50Sn  | 122 | 0.2  |
| 9.  | 53I     |     | 6.1   | → | 54Xe   |     |      |
|     | 100.00% | 127 | 6.1   |   |        | 128 | 8.0  |
|     |         |     |       |   | +52Te  | 128 | 0.2  |
| 10. | 55Cs    |     | 29.0  | → | 56Ba   |     |      |
|     | 100.00% | 133 | 29.0  |   | 2.42%  | 134 | 2.0  |
|     |         | 134 | 151.0 |   | 6.59%  | 135 | 5.8  |
| 11. | 57La    |     | 9.0   | → | 58Ce   |     |      |
|     | 0.09%   | 138 | 57.0  |   |        |     |      |
|     | 99.91   | 139 | 8.9   |   | 88.48% | 140 | 0.5  |
| 12. | 59Pr    |     | 11.5  | → | 60Nd   |     |      |
|     | 100.00% | 141 | 11.5  |   | 27.11% | 142 | 18.7 |

TABLE 6-continued

| | Z % | A | b | Z % | A | b |
|---|---|---|---|---|---|---|
| 13. | 60Nd | | 50.5 | 61Pm | | |
| | 17.22% | 146 | 1.4 | 0.% | 1.47 | 168.4 |
| | 5.73% | 148 | 2.5 | 0.% | 149 | 1400.0 |
| | 5.62% | 150 | 1.2 | 0.% | 151 | 700.0 |
| | | | | +62Sm | 1.47 | 57.0 |
| | | | | +62Sm | 149 | 42080.0 |
| | | | | +63Eu | 151 | 9100.0 |
| 14. | 62Sm | | 5922.0 → | 63Eu | | |
| | 7.44% | 150 | 104.0 | | 151 | 9100.0 |
| | 26.72% | 152 | 206.0 | | 153 | 312.0 |
| | | | | +64Gd | 152 | 735.0 |
| 15. | 64Gd | | 49700.0 → | 65Tb | | |
| | 0.20% | 152 | 735.0 | | | |
| | 24.87% | 158 | 2.2 | 100.00% | 159 | 23.4 |
| | 21.90% | 160 | 0.8 | +Dy | 161 | 600.0 |
| | | | | +Eu | 153 | 312.0 |
| 16. | 65Tb | | 23.4 → | 66Dy | | |
| | 100.00% | 159 | 23.4 | 2.29% | 160 | 56.0 |
| 17. | 66Dy | | 994.0 → | 67Ho | | |
| | 0.05% | 156 | 33.0 | | | |
| | 0.09% | 158 | 43.0 | | | |
| | 28.18 | 164 | 2840.0 | 100.00% | 165 | 64.7 |
| | | | | +64Gd | 157 | 259000.0 |
| | | | | +65Tb | 159 | 23.4 |
| 18. | 68Er | | 159.0 → | 69Tm | | |
| | 0.13% | 162 | 19.0 | | | |
| | 1.56% | 164 | 13.0 | | | |
| | 27.07% | 168 | 2.7 | 100.00% | 169 | 100.0 |
| | 14.88% | 170 | 5.8 | +67Ho | 163 | |
| | | | | +67Ho | 165 | 64.7 |
| | | | | +70Yb | 171 | 48.6 |
| 19. | 70Yb | | 34.8 → | 71Lu | | |
| | 31.84% | 174 | 69.4 | 97.40% | 175 | 21.0 |
| | 12.37% | 176 | 2.8 | +72Hf | 177 | 373.0 |
| 20. | 71Lu | | 74.0 → | 72Hf | | |
| | 97.40% | 175 | 21.0 | | | |
| | 2.60% | 176 | 2065.0 | 18.50% | 177 | 373.0 |
| 21. | 72Hf | | 104.0 → | 73Ta | | |
| | 0.18% | 174 | 561.0 | | | |
| | 18.50% | 177 | 373.0 | | | |
| | 35.23% | 180 | 13.0 | 999.98 | 181 | 20.5 |
| | | | | +71Lu | 175 | 21.0 |
| | | | | +72Hf | 178$^{m2}$ | |
| 22. | 74W | | 18.3 → | 75Re | | |
| | 0.13% | 180 | 30.0 | | | |
| | 30.64% | 184 | 1.7 | 37.07% | 185 | 112.0 |
| | 28.41% | 186 | 37.9 | 62.93% | 187 | 76.4 |
| | | | | +73a | 181 | 20.5 |
| 23. | 75Re | | 89.7 → | 76.0s | | |
| | 37.07% | 185 | 112.0 | 1.59% | 186 | 80.0 |
| | 62.93% | 1887 | 76.4 | 13.30% | 188 | 4.7 |
| | | | | + | 187 | 320.0 |
| | | | | + | 189 | 25.0 |
| 24. | 80Hg | | 372.3 → | 81Tl | | |
| | 0.14% | 196 | 3080.0 | | | |
| | 29.80% | 202 | 4.9 | | 203 | 11.4 |
| | 6.85% | 204 | 0.4 | | 205 | 0.1 |
| | | | | +79Au | 197 | 98.6 |
| 25. | 90Th | | 7.3 → | 91Pa | | |
| | 100.00% | 232 | 7.3 | | 233 | 39.5 |
| | | | | +92U | 233 (n, γ) | 45.5 |
| | | | | | 233 (n, f) | 529.0 |
| | | | | | 233 Σ | 574.5 |

The oxides, carbides, nitrides and most important compounds of the transmutable parent elements are as follows: $VO_2$, $V_2O_5$, VC, VN, $VSi_2$; $MnO_2$, MnS, $MnCl_2$; $Ga_2O_3$, GaAs; $As_2S_3$; AgCl; $Sb_2O_3$, $Sb_2S_3$; $La_2O_3$, $LaF_3$; $Pr_2O_3$, $PrF_3$; $Nd_2O_3$, $NdF_3$; $Sm_2O_3$, $SmF_3$; $Tb_2O_3$, $TbF_3$; $Dy_2O_3$, $DyF_3$; $Er_2O_3$, $ErF_3$; $Yb_2O_3$, $YbF_3$; $Lu_2O_3$, $LuF_3$; $HfO_2$, HfC, HfN, $HfSi_2$; $WO_3$, WC, $WSi_2$, $WS_2$; $Re_2O_7$; HgS; $ThO_2$, $ThC_2$, $ThF_4$, $ThOF_2$, $ThS_2$.

In what follows, the inventive solutions will be illustrated via some exemplary transmutation reactions under indenture numbers 3, 13, 14, 15, 17, 18, 19, 22, 23, 24 and 25 from the reactions listed in Table 6, wherein the extended set of the isotopes involved in the corresponding target (parent element)→product (daughter element) reaction, i.e. the isotope proportions in units of mass %, the related neutron-capture cross-sections in units of barn, the half times T(½), the types of radiations emitted, and finally some important transmutation processes are given. The impurities in the target (parent element) are considered to be characteristic impurities and with the assumption that the target (parent element)

has got a chemical purity of 99.9%. The activation of said impurities is not taken into account.

Example 1

Gallium→Germanium

Impurities in Ga: there are no characteristic impurities.

TABLE 7

| 31Ga | % | barn 2.7 | T(½) | radiation |
|---|---|---|---|---|
| 69 | 60.40 | 2.2 | | |
| 70$^m$ | | | 0.0 s | γ |
| 70 | | | 21.1 min | e$^-$ γ |
| 71 | 39.60 | 3.6 | | |
| 72$^m$ | | | 0.0 s | γ |
| 72 | | | 14.1 hours | e$^-$ γ |

| 32Ge | % | barn 2.2 | T(½) | radiation |
|---|---|---|---|---|
| 70 | 20.52 | 3.0 | | |
| 71$^m$ | | | 0.0 s | γ |
| 71 | | | 11.4 hours | e$^+$ K |
| 71 | 27.43 | 0.8 | | |
| 73$^m$ | | | 0.5 s | |
| 73 | 7.76 | 15.1 | | |
| 74 | 36.53 | 0.4 | | |
| 75 | | | 1.4 hours | e$^-$ γ |
| 76 | 7.76 | 0.1 | | |
| 77$^m$ | | | 53.0 s | e$^-$ |
| 77 | | | 11.3 hours | |

Ga69→Ga70→Ge70; +Zn70

Ga71→Ga72→Ge72.

Example 2

Neodymium→Promethium

Here, promethium has got no stable isotopes.
Impurities in Nd: La, Ce, Pr, Sm; Y; Si; Fe.

TABLE 8

| 60Nd | % | barn 50.5 | T(½) | radiation |
|---|---|---|---|---|
| 142 | 27.11 | 18.7 | | |
| 143 | 12.17 | 337.0 | | |
| 144 | 23.85 | 3.6 | 2.1*15$^{15}$ years | α |
| 145 | 8.30 | 42.0 | | |
| 146 | 17.22 | 1.4 | | |
| 147 | | | 11.0 days | e$^-$ γ |
| 148 | 5.73 | 2.5 | | |
| 149 | | | 1.7 hours | e$^-$ γ |
| 150 | 5.62 | 1.2 | | |
| 151 | | | 12.4 min | e$^-$ γ |

| 61Pm | % | barn 60.0 | T(½) | radiation |
|---|---|---|---|---|
| 146 | | | 5.5 years | e$^-$ γ K |
| 147 | | 168.4 | 2.6 years | e$^-$ |
| 148$^m$ | | 10600.0 | 41.3 days | e$^-$ γ |
| 148 | | | 5.4 days | e$^-$ γ |

TABLE 8-continued

| 149 | | | 53.0 hours | e$^-$ γ |
| 150 | | | 2.7 hours | e$^-$ γ |
| 151 | | | 1.1 days | e$^-$ γ |

Nd146→Nd147→Pm147→Sm147.  (a)

Nd148→Nd149→Pm149→Sm149.  (b)

Nd150→Nd151→Pm151→Sm151→Eu151.  (c)

Example 3

Samarium→Europium

Impurities in Sm: Gd; Ca, Y; Mg, Si; Fe.

TABLE 9

| 62Sm | % | barn 5922.0 | T(½) | radiation |
|---|---|---|---|---|
| 144 | 3.09 | 0.7 | | |
| 145 | | | 340.0 days | e$^+$ γ K |
| 146 | | | 5.0*10$^7$ years | α |
| 147 | 14.97 | 57.0 | 1.0*10$^{11}$ years | α |
| 148 | 11.24 | 2.4 | | |
| 149 | 13.83 | 42080.0 | | |
| 150 | 7.44 | 104.0 | | |
| 151 | | 15170.0 | 90.0 years | e$^-$ γ |
| 152 | 26.72 | 206.0 | | |
| 153 | | 420.0 | 46.3 hours | e$^-$ γ |
| 154 | 22.71 | 8.4 | | |
| 155 | | | 22.3 min | e$^-$ γ |
| 156 | | | | |

| 63Eu | % | barn 4530.0 | T(½) | radiation |
|---|---|---|---|---|
| 151 | 47.82 | 9100.0 | | |
| 152$^m$ | | | 9.2 hours | e$^±$ γ K |
| 152 | | 12800.0 | 12.2 years | e$^±$ γ K |
| 153 | 52.18 | 312.0 | | |
| 154 | | 1340.0 | 8.6 years | e$^-$ γ |
| 155 | | | 4.7 years | e$^-$ γ |

Sm144→Sm145→Pm145→Nd145.  (a)

(Sm150+)→Sm151→
    Eu151→Eu152$^m$→Eu152→G152.  (b)

(Sm150+)→Sm151→Sm152→Sm153→Eu153.  (c)

Sm152→Sm153→Eu153→Sm154→Sm155→Eu155→Gd155.  (d)

Sm154→Sm155→Eu155→Eu156→Gd156.  (f)

Remark: here, in the reaction process Sm149→Sm150, Sm150 gets significantly enriched; this enrichment is referred to by the symbol of (Sm150+).

Example 4

Gadolinium→Terbium

Impurities in Gd: Nd, Eu, Tb; Y; Al, Si, Ca, Fe, Ag.

TABLE 10

| "a" 64Gd | % | barn 49700.0 | T(½) | radiation |
|---|---|---|---|---|

TABLE 10-continued

| | | | | |
|---|---|---|---|---|
| 152 | 0.20 | 735.0 | $1.1*10^{14}$ | α |
| 153 | | | 240.4 days | $e^+$ γ K |
| 154 | 2.15 | 85.0 | | |
| 155 | 14.73 | 61100.0 | | |
| 156 | 20.47 | 1.5 | | |
| 157 | 15.68 | 259000.0 | | |
| 158 | 24.87 | 2.2 | | |
| 159 | | | 18.5 hours | $e^-$ γ |
| 160 | 21.90 | 0.8 | | |
| 161 | | | 3.6 min | $e^-$ γ |

| "b" 65Tb | % | barn 23.4 | T(½) | radiation |
|---|---|---|---|---|
| 159 | 100 | 23.4 | | |
| 160 | | 592.0 | 72.3 days | $e^-$ γ |
| 161 | | | 6.9 days | $e^-$ γ |
| 162 | | | 2.0 hours | $e^-$ γ |

During the activation of Gd, in the reaction process Gd152→Gd153, $e^+$ and K radiations are emitted in 100%. In particular:

Gd152→Gd153→Eu153. (a)

(Gd158+)→Gd159→Tb159. (This reaction can be exploited.) (b)

Gd160→Gd161→Tb161→Dy161. (c)

Gd160→Gd161→Tb161→Tb162→Dy162. (d)

Example 5

Dysprosium→Holmium

Impurities in Dy: Tb, Y, Ho, Yb, Er, Ca.

TABLE 11

| "a" 66Dy | % | barn 994.0 | T(½) | radiation |
|---|---|---|---|---|
| 156 | 0.05 | 33.0 | | |
| 157 | | | 8.5 hours | $e^+$ γ K |
| 158 | 0.09 | 43.0 | | |
| 159 | | | 139.0 days | $e^+$ γ K |
| 160 | 2.29 | 56.0 | | |
| 161 | 18.88 | 600.0 | | |
| 162 | 25.53 | 194.0 | | |
| 163 | 24.97 | 124.0 | | |
| 164 | 28.18 | 2840.0 | | |
| 165$^m$ | | | 1.2 min | $e^-$ γ |
| 165 | | 564.0 | 2.3 hours | $e^-$ γ |
| 166 | | | 80.2 hours | $e^-$ γ |
| 167 | | | 4.4 min | $e^-$ γ |

| "b" 67Ho | % | barn 64.7 | T(½) | Radiation |
|---|---|---|---|---|
| 165 | 100 | 64.7 | | |
| 166$^m$ | | | 1200 years | γ |
| 166 | | | 26.8 hours | $e^-$ γ |
| 167$^m$ | | | 30 years | |
| 167 | | | 3.0 hours | $e^-$ γ |

When Ho is produced, overactivation of the system should be avoided as one can easily pass Ho165. In case of Dy157 and Dy159, the following processes undergo ($e^+$ and K radiations are emitted in 100%):

Dy156→Dy157→Tb157; and (a)

Dy158→Dy159→Tb159 (b)

Dy164→Dy165$^m$→Dy165→Ho165 (This reaction can be exploited.) (c)

If overactivation takes place, branching of the process might arise:

Dy164→Dy165$^m$→Dy165→Dy166→Ho166$^m$→Ho166→Er166. (d)

Example 6

Erbium→Thulium

Impurities in Er: Dy, Ho, Tm; Y; Ca, Fe.

TABLE 12

| 68Er | % | barn 159.0 | T(½) | radiation |
|---|---|---|---|---|
| 162 | 0.13 | 19.0 | | |
| 163 | | | 75.0 min | $e^±$ γ K |
| 164 | 1.56 | 13.0 | | |
| 165 | | | 10.3 hours | $e^±$ γ K |
| 166 | 33.41 | 19.6 | | |
| 167$^m$ | | | 2.5 s | γ |
| 167 | 22.90 | 659.0 | | |
| 168 | 27.07 | 2.7 | | |
| 169 | | | 9.4 days | $e^-$ γ |
| 170 | 14.88 | 5.8 | | |
| 171 | | 280.0 | 7.5 hours | $e^-$ γ |

| 69Tm | % | barn 100.0 | T(½) | radiation |
|---|---|---|---|---|
| 167 | | | 9.6 days | γ K |
| 168 | | | 87.0 days | $e^-$ γ K |
| 169 | 100.00 | 100.0 | | |
| 170 | | 169.0 | 128.6 days | $e^±$ γ K |
| 171 | ≈100. | | 1.9 years | $e^-$ γ |

Er162→Er163→Ho163. (a)

Er164→Er165→Ho165. (b)

(Er168+)→Er169→Tm169. (c)

Er170→Er171→Tm171→Yb171. (d)

Example 7

Ytterbium→Lutetium

Impurities in Yb: La, Tm, Lu; Ca, Fe.

TABLE 13

| 70Yb | % | barn 34.8 | T(½) | radiation |
|---|---|---|---|---|
| 168 | 0.13 | 2230.0 | | |
| 169$^m$ | | | 46.0 s | γ |
| 169 | | | 32.0 days | $e^±$ γ K |
| 170 | 3.03 | 11.4 | | |
| 171 | 14.31 | 48.6 | | |
| 172 | 21.82 | 0.8 | | |
| 173 | 16.13 | 17.1 | | |
| 174 | 31.84 | 69.4 | | |
| 175$^m$ | | | 0.0 s | γ |
| 175 | | | 101.0 hours | $e^-$ γ |

TABLE 13-continued

| | | | | |
|---|---|---|---|---|
| 176 | 12.73 | 2.8 | | |
| 177$^m$ | | | 6.5 s | γ |
| 177 | | | 1.9 hours | e$^-$ γ |

| 71Lu | % | barn 74.0 | T(½) | radiation |
|---|---|---|---|---|
| 174$^m$ | | | 90.0 days | γ |
| 174 | | | 163.0 days | γ K |
| 175 | 97.40 | 21.0 | | |
| 176$^m$ | | 16.7 | 3.6 hours | e$^+$ γ K |
| 176 | 2.60 | 2065.0 | 6.7*10$^{10}$ years | e$^-$ γ |
| 177$^m$ | | 2.8 | 160.4 days | e$^-$ γ |
| 177 | | 1000.0 | 6.7 days | e$^-$ γ |

$$Yb168 \rightarrow Yb169^m \rightarrow Yb169 \rightarrow Tm169. \quad (a)$$

$$Yb174 \rightarrow Yb175^m \rightarrow Yb175 \rightarrow Lu175. \quad (b)$$

$$Yb176 \rightarrow Yb177^m \rightarrow Yb177 \rightarrow Lu177^m \rightarrow Lu177 \rightarrow Hf177. \quad (c)$$

Example 8

Tungsten→Rhenium (→Osmium)

Impurities in W: Mo; Mg, Si; Ca, Ti; Fe, Cu, Sn, Pb.

TABLE 14

| 75W | % | barn 18.3 | T(½) | radiation |
|---|---|---|---|---|
| 180 | 0.13 | 30.0 | | |
| 181 | | | 121.2 days | e$^+$ γ K |
| 182 | 26.41 | 20.7 | | |
| 183$^m$ | | | 5.3 s | γ |
| 183 | 14.40 | 10.1 | | |
| 184 | 30.64 | 1.7 | | |
| 185$^m$ | | | 1.6 min | γ |
| 185 | | | 75.1 days | e$^-$ γ |
| 186 | 26.41 | 37.9 | | |
| 187 | | 90.0 | 23.7 hours | e$^-$ γ |

| 75Re | % | barn 89.7 | T(½) | radiation |
|---|---|---|---|---|
| 184 | | | 38.0 days | γ K |
| 185 | 37.07 | 112.0 | | |
| 186$^m$ | | | 1.0 hours | γ |
| 186 | | | 88.9 hours | e$^+$ γ K |
| 187 | 62.93 | 76.4 | 4.1*10$^{10}$ years | |
| 188$^m$ | | 2.0 | 18.6 min | γ |
| 188 | | ≈2.0 | 17.0 hours | e$^-$ γ |

| 76Os | % | barn 16.0 | T(½) | radiation |
|---|---|---|---|---|
| 186 | 1.59 | 80.0 | | |
| 187 | 1.64 | 320.0 | | |
| 188$^m$ | | | 26.0 days | γ |
| 188 | 13.30 | 4.7 | | |

$$W180 \rightarrow W181 \rightarrow Ta181. \quad (a)$$

$$W184 \rightarrow W185^m \rightarrow Wo185 \rightarrow Re185. \quad (b)$$

$$W186 \rightarrow W187 \rightarrow Re187. \text{ (and/or: tungsten} \rightarrow \text{rhenium} \rightarrow \text{osmium)} \quad (c)$$

$$W184 \rightarrow W185^m \rightarrow W185 \rightarrow Re185 \rightarrow Re186^m \rightarrow Re186 \rightarrow Os186; +W186. \quad (d)$$

$$W186 \rightarrow W187 \rightarrow Re187 \rightarrow Re188^m \rightarrow Re188 \rightarrow Os188^m \rightarrow Os188. \quad (e)$$

$$W186 \rightarrow W187 \rightarrow W188 \rightarrow Re188^m \rightarrow Re188 \rightarrow Os188^m \rightarrow Os188. \quad (f)$$

Example 9

Rhenium→Osmium

Impurities in Re: Fe, Mo; Al, Cr, Co, Ni, Cu; Ti, Zr.

TABLE 15

| 75Re | % | barn 89.7 | T(½) | radiation |
|---|---|---|---|---|
| 184 | | | 38.0 days | γ K |
| 185 | 37.07 | 112.0 | | |
| 186$^m$ | | | 1.0 hours | γ |
| 186 | | | 88.9 hours | e$^+$ γ K |
| 187 | 62.93 | 76.4 | 4.1*10$^1$ years | |
| 188$^m$ | | 2.0 | 18.6 min | γ |
| 188 | | ≈2.0 | 17.0 hours | e$^-$ γ |

| 76Os | % | barn 16.0 | T(½) | radiation |
|---|---|---|---|---|
| 184 | 0.02 | 3000.0 | | |
| 185 | | | 93.6 days | e$^+$ γ K |
| 186 | 1.59 | 80.0 | | |
| 187 | 1.64 | 320.0 | | |
| 188$^m$ | | | 26.0 days | γ |
| 188 | 13.30 | 4.7 | | |
| 189$^m$ | | | 5.8 hours | γ |
| 189 | 16.10 | 25.0 | | |
| 190$^m$ | | 0.0 | 9.9 min | γ |
| 190 | 26.40 | 13.1 | | |
| 191$^m$ | | 9.2 | 13.1 hours | γ |
| 191 | | 3.9 | 15.4 days | e$^-$ γ |
| 192 | 40.95 | 2.0 | | |
| 193 | | ≈600.0 | 30.6 hours | e$^-$ γ |
| 194 | | | 1.9 years | e$^-$ |

$$Re185 \rightarrow Re186^m \rightarrow Re186 \rightarrow Os186; +W186 \quad (a)$$

$$Re187 \rightarrow Re188^m \rightarrow Re188 \rightarrow Os188^m \rightarrow Os188. \quad (b)$$

The thus obtained Os can be activated further in a process Osmium→Osmium:

$$Os186 \rightarrow Os187. \quad (c)$$

$$Os188 \rightarrow Os189^m \rightarrow Os189. \quad (d)$$

Example 10

Mercury→Thallium+Gold

Impurities in Hg: there are no characteristic impurities.

TABLE 16

| 80Hg | % | barn 372.3 | T(½) | radiation |
|---|---|---|---|---|
| 196 | 0.14 | 3080.0 | | |
| 197$^m$ | | | 23.8 hours | e$^+$ γ K |
| 197 | | | 64.1 hours | e$^+$ γ K |
| 198 | 10.02 | 2.0 | | |
| 199$^m$ | | | 42.6 min | γ |
| 199 | 16.84 | 2150.0 | | |
| 200 | 23.12 | 60.0 | | |
| 201 | 13.22 | 7.8 | | |
| 202 | 29.80 | 4.9 | | |

TABLE 16-continued

| | | barn | | |
|---|---|---|---|---|
| 203 | | | 46.6 days | e⁻ γ |
| 204 | 6.85 | 0.4 | | |
| 205 | | | 5.1 min | e⁻ γ |
| 206 | | | 7.5 min | e⁻ γ |

| 81Tl | % | barn 3.4 | T(½) | radiation |
|---|---|---|---|---|
| 203 | 29.50 | 11.4 | | |
| 204 | | | 3.8 years | e⁻ K |
| 205 | 70.50 | 0.1 | | |
| 206 | | | 4.3 min | e⁻ |

| 94Au | % | barn 98.6 | T(½) | radiation |
|---|---|---|---|---|
| 197$^m$ | | | 7.4 s | γ |
| 197 | 100.00 | 98.6 | | |
| 198$^m$ | | | 2.2 days | γ |
| 198 | | 26000.0 | 2.7 days | e⁻ γ |
| 199 | | 33.8 | 3.1 days | e⁻ γ |

Hg196→Hg197$^m$→Hg197→Au197.     (a)

Hg196→Hg197$^m$→Hg197→Au197$^m$→Au197.     (b)

Hg196→Hg197$^m$→Hg197→Au197$^m$→Au197→
Au198→Au199→Hg199$^m$→Hg199.     (c)

Hg202→Hg203→Tl203.     (d)

Hg204→Hg205→Tl205.     (e)

Example 11

Thorium→Protactinium (→Uranium)

Impurities in Th: N; Al, Ca, Fe; Mg, Si.

TABLE 17

| 90Th | % | barn 7.3 | T(½) | radiation |
|---|---|---|---|---|
| 232 | 100.00 | 7.3 | 1.4*10¹⁰ years | α γ |
| 233 | | 1580.0 | 21.8 min | e⁻ γ f |
| 234 | | 2.0 | 24.1 days | e⁻ γ |

| 91Pa | % | barn | T(½) | radiation |
|---|---|---|---|---|
| 233 | 39.5 | | 27.0 days | e⁻ γ |
| 234$^m$ | | | 1.1 min | e⁻ γ f |
| 234 | | | 6.7 hours | e⁻ γ f |
| 235$^m$ | | | 24.0 min | e⁻ |

| 92U | % | barn 7.5 | T(½) | radiation |
|---|---|---|---|---|
| 233 | | 45.5 | 1.6*10⁵ years | α γ f |
| 234 | 0.00 | 100.0 | 2.4*10⁵ years | α γ |
| 235$^m$ | | | 26.5 min | γ |
| 235 | 0.72 | 98.8 | 7.0*10⁸ years | α γ f |
| 236 | | 5.1 | 2.3*10⁷ years | α γ |
| 237 | | | 6.7 days | e⁻ γ |
| 238 | 99.27 | 2.7 | 4.4*10⁹ years | α γ |
| 239 | | 24.8 | 22.4 min | |

The Th moderator can be: $ThO_2$; $ThC_2$.

Remark: the elements produced by α-decay are not recorded in Table 17.

The (n, f) fission reaction taking place here in detail, i.e. per elements and isotopes:

| Th | 233 | 15.0 barn |
|---|---|---|
| Pa | 233$^m$ | 500.0 barn |
| | 234 | 5000.0 barn |
| U | 233 | 529.0 barn |
| | 234 | 0.0 barn |
| | 235 | 582.0 barn |
| | 236 | 0.0 barn |
| | 237 | 0.3 barn |
| | 238 | 0.0 barn |
| | 239 | 14.0 barn |

Th232→Th233→Pa233→U233.     (a)

Th232→Th233→Th234→Pa234$^m$→Pa234→
U234→U235$^m$→U235.     (b)

Th232→Th233→Th234→Pa234$^m$→Pa234→
Pa235→U235$^m$→U235.     (c)

Returning now to some questions of producibleness of the industrial scale transmutation according to the present invention, the following can be added.

As a working hypothesis it is assumed that the thermal neutron flux that can be thermalized by the external and the internal moderators is $1*10^{14}$ n/cm²/s, the activation surface of the cassette is 1 m²=10000 cm², and the density of mass of the target (parent element) is g(mol)/cm², that is, it corresponds to the atomic mass unit (amu) of the chemical element concerned expressed in units of g/cm², e.g. for the element of 45Rh 103, the density of mass of the target made of 45Rh 103 is equal to 102.9 g(mol)/cm², as said element is constituted in 100% from its isotope of mass number 103. This means that the total mass of the target (parent element) in a single cassette is 1029 kg. The question is then: how long should be the target activated (here, the losses, the increase in efficiency, the screening, etc. are not considered) and how many daughter elements could be produced in said target? The molar (amu) density of mass was chosen as in this way each target (parent element) comprises the same amount of atoms, that is, there are $6.022142*10^{23}$ atoms per moles in each target. If the thermal neutron flux is $1*10^{14}$ n/cm²/s—and considering a neutron-capture cross-section of 1 barn—, simply saying, an activation time of $6.022142^9$ s, or (if a year comprising 365 days is considered) 190.961 years are required to activate the whole molar mass. In case of e.g. rhodium (and other elements as well) this activation time should be divided by the actual value of the cross-section in order to receive the activation time needed for the element concerned; for rhodium this leads to 190.961/144.8=1.318 years. That is, considering a calendar year of 365 days, the above amount of rhodium cannot be fully transmutated (as its cross-section is less than 190.9) and its daughter element in the amount of 780.7 kg/years/cassette is produced.

Having the above knowledge in mind, the cross-section values (in units of barn), the atomic mass unit g(mol) (in units of grams), the volume density D (in units of g/cm³), the length Lcm belonging to 1 cm², the total activation time $T_{activation}$ (in units of years), as well as the total activated mass to be expected in a cassette having an activation surface of 1 m² during one calendar year are summarized for the above discussed twenty-five various targets (parent elements) in the following table (see Table 18 below). In the table, ten targets (parent elements) are denoted by *; these targets are homogeneous as to their isotope content, i.e. they are constituted by the same isotope in about 100%.

TABLE 18

|    | Z | barn | g (mol) (g) | D (g/cm³) | Lcm | $T_{activation}$ (years) | (kg/m²)/ years |
|---|---|---|---|---|---|---|---|
| 1.* | 23V | 3.0 | 50.9 | 6.11 | 8.3 | 64.653 | 7.996 |
| 2.* | 25Mn | 13.3 | 54.9 | 7.30 | 7.5 | 14.358 | 38.236 |
| 3. | 31Ga | 2.7 | 69.7 | 5.90 | 11.8 | 70.726 | |
| 4.* | 33As | 4.5 | 74.9 | 5.73 | 13.0 | 42.435 | 17.650 |
| 5. | 35Br | 6.9 | 79.9 | 3.12 | 25.6 | 27.675 | |
| 6.* | 45Rh | 144.8 | 102.9 | 12.41 | 8.3 | 1.318 | 780.728 |
| 7. | 47Ag | 63.3 | 107.8 | 10.50 | 10.2 | 3.016 | |
| 8. | 51Sb | 4.9 | 121.7 | 6.69 | 18.2 | 38.971 | |
| 9.* | 54I | 6.1 | 126.9 | 4.93 | 25.7 | 31.305 | 40.536 |
| 10.* | 55Cs | 29.0 | 132.9 | 1.87 | 71.0 | 6.585 | 201.822 |
| 11.* | 57La | 9.0 | 138.9 | 6.14 | 22.6 | 21.218 | 65.463 |
| 12.* | 59Pr | 11.5 | 140.9 | 6.77 | 20.8 | 16.605 | 84.854 |
| 13. | 60Nd | 50.5 | 144.2 | 7.00 | 20.6 | 3.871 | |
| 14. | 62Sm | 5922.0 | 150.3 | 7.52 | 20.0 | 0.032 | |
| 15. | 64Gd | 49700.0 | 157.2 | 7.90 | 19.9 | 0.004 | |
| 16.* | 65Tb | 23.4 | 158.9 | 8.23 | 19.3 | 8.160 | 194.730 |
| 17. | 66Dy | 994.0 | 162.5 | 8.55 | 19.0 | 0.192 | |
| 18. | 68Er | 159.0 | 167.2 | 9.06 | 18.4 | 1.201 | |
| 19. | 70Yb | 34.8 | 173.0 | 6.96 | 24.8 | 5.487 | |
| 20. | 71Lu | 74.0 | 174.9 | 9.84 | 17.8 | 2.580 | |
| 21. | 72Hf | 104.0 | 178.5 | 13.31 | 13.4 | 1.836 | |
| 22. | 74W | 18.3 | 183.8 | 19.30 | 9.5 | 10.4335 | |
| 23. | 75Re | 89.7 | 186.2 | 21.02 | 8.8 | 2.129 | |
| 24. | 80Hg | 372.3 | 200.6 | 13.54 | 14.8 | 0.513 | |
| 25.* | 90Th | 7.3 | 232.0 | 11.72 | 19.8 | 26.159 | 88.708 |

Apparently, the material thickness (Lcm) of the target is to be divided into smaller sections, wherein the internal moderators can be arranged between the thus obtained sections. The lengths of said sections might depend on the initial spectrum of the reactor—the neutron flux is smaller in the intermedier range than e.g. in the thermal range of an initial neutron spectrum—and, thus, the lengths of the individual target sections may vary.

In view of the above basic data, three practically realizable ways are proposed here to increase the production on the industrial scale:

(a) Intense cooling of the cassette containing the target/moderator structure according to the invention. Here, due to the cooling, on the one hand, an increase in density occurs as a consequence of the shrinkage of the elements (due to their coefficients of thermal expansion) constituting the target/moderator structure. This increases the neutron-capture cross-section (in units of barn) of the target and thereby affects the moderation characteristics, and, on the other hand, the speed of the thermal neutrons will be smaller (about 2200 m/s) that can have a favorable effect as well; that is, it is preferred and advantageous to optimize the operational temperature of the combined target/moderator structure according to the invention.

(b) Increasing the applied thermal neutron flux ($1*10^{14}$ n/cm²/s). It was already mentioned in the introduction part of the present application that the (γ, n) and (n, 2n) nuclear reactions are of low yield for the purposes of the present invention and, hence, cannot be exploited to the merit. The fuel assemblies of a nuclear reactor can be arranged so as to increase the neutron flux up to a certain extent at the cassette front side, however, this state cannot be always maintained. The essence of this is that the so-called neutron leakage from the reactor, the approximate value of which is 3.5±2.5%, is increased.

(c) Arranging fissile element(s), e.g. U233, U235, etc. in front of the front side of the cassette. It is preferred if the fissile element is enriched with a natural element or even with U238 (it is a common practice to enrich U238 with U235 in the extent of 2.0 to 5.0%). Here, in a single (n, f) thermal fission event 2.5 neutrons are produced on average, from which about 0.09 neutrons (≈3.5%) represent the "leakage" and the actual neutron multiplication yield (breeding) is ≈1.4 neutrons. This neutron multiplication could contribute to the applied neutron flux so as to increase it—in principle—by about one order of magnitude, up to the value of $1*10^{15}$ n/cm²/s. The problem here would be that in case of e.g. U235, the energy of 1 kW is released at a yield of $3.1*10^{13}$ fission/s which clearly occurs for a thermal neutron flux of the same magnitude leaving the nuclear reactor.

To remove said heat released intensively, it is proposed to apply the fissile element in the form of e.g. a layer with a layer thickness of said fissile element falling into the range of 0.1-2.0 mm onto a substrate. To ensure good heat conductivity and equal coefficients of thermal expansion, said substrate should be made of a Ni sheet (foil) with a thickness of 1.0-2.0 mm (being, optionally, alloyed with 2-5% Be), wherein the surface of the fissile element layer is also coated with Ni.

Several pieces of said foil with fissile element can be arranged in a cassette adopted specifically to this purpose. The space defined by the foils (sheets) has to be subjected to an intense cooling. It is thought that known cooling media are suitable for the cooling only to a restricted extent. Thus, gallium is proposed to be used as the cooling medium as its boiling temperature is about 2200° C. and its mean neutron-capture cross-section is relatively low, i.e. 2.7 barn. The fissile element is deposited onto the sides of one or more Ni substrate sheets/foils which also carry a Ni coat on their outer side surfaces. This embodiment is heat and chemical resistant up to 400-500° C. The space formed between said sheets is filled with Ga functioning as both a moderator and a cooling medium; to enhance the efficiency of cooling, said Ga can be made to flow. The daughter element Ge produced in the gallium moderator and cooling medium can be filtered out when said fissile elements are replaced. The cassette containing said fissile element can be moved and operated independently of the containers with the combined target/moderator structure according to the invention.

The invention claimed is:

1. An article for being subjected to neutron activation on an industrial scale, the article comprising:
   moderators and targets configured to be arranged in a propagation path of neutrons provided to complete the activation,
   wherein the targets comprise at least one substance to be converted/transmutated through various decay/activation schemes,
   wherein said article is provided as a single unit comprised of at least two moderators and at least two targets arranged in an alternating manner along the propagation direction of said neutrons,
   wherein each of said moderators is made of a substance that shifts the energy of at least a portion of the incident neutrons initially provided into a thermal energy range so as to maximize the number of thermal neutrons within each of said targets for the activation,
   wherein each of the moderators and each of the targets is canned or put into a cassette separately.

2. The article according to claim 1, wherein the total thickness of the target is at least 2.0 cm and the irradiated surface of the cassette is at least 1000 cm².

3. The article according to claim 1, wherein the moderator is made of at least one substance chosen from the group of H, He, Be, C, O, Mg, Al, Si, Ca, Rb, Zr, Sn, Pb, Bi; and $D_2$, $He_4$, $Li_7$, $B_{11}$, and $Al_4C_3$, $N_{15}$, $Pb_{208}$; $H_2O$, $D_2O$, paraffin; BeO, $CO_2$, MgO, $Al_2O_3$, SiO, $SiO_2$, SiC, $ZrO_2$, ZrC, $SnO_2$, PbO, $Bi_2O_3$; as well as polycarbonates (PC), polyethylene (PE), polyimides (PI), polytetrafluoroethylene (PTFE) and a mixture of these substances.

4. The article according to claim 1, wherein the target is made of at least one substance chosen from the group of V, Mn, Ga, As, Br, Rh, Ag, Sb, I, Cs, La, Pr, Nd, Sm, Gd, Tb, Dy, Er, Yb, Lu, Hf, W, Re, Hg, Th; $VO_2$, $V_2O_5$, VC, VN, $VSi_2$, $MnO_2$, MnS, $MNCl_2$; $Ga_2O_3$, GaAs; $AS_2S_3$, $Sb_2O_3$, $Sb_2S_3$; $La_2O_3$, $LaF_3$; $Pr_2O_3$, $PrF_3$; $Nd_2O_3$, $NdF_3$; $Sm_2O_3$, $SmF_3$; $Gd_2O_3$, $GdF_3$; $Tb_2O_3$; $TbF_3$; $Dy_2O_3$, $DyF_3$; $Er_2O_3$, $ErF_3$; $Yb_2O_3$; $YbF_3$; $Lu_2O_3$, $LuF_3$; $HfO_2$, HfC, HfN, $HfSi_2$; $WO_3$, WC, $WSi_2$, $WS_2$; $Re_2O_7$; HgS; $ThO_2$, $ThC_2$, $ThF_4$, $ThOF_2$, $ThS_2$, as well as any mixture and/or alloy and/or combination of these substances.

5. The article according to claim 1 and configured such that an (n, γ) thermal neutron-capture cross-section in the neutron activation is at least 2.0 barn for the target material or any isotope thereof, and the applied flux of the thermal neutrons is $1*10^{14}$ n/cm²/s.

6. The article according to claim 1, wherein the structure is provided with cooling.

7. The article according to claim 1, wherein a fissile material is arranged along the propagation direction of the neutrons in front of the structure.

8. The article according to claim 1, wherein the separately canned or cassetted moderators and targets are arranged in a container.

9. The article according to claim 1, wherein a neutron reflector is arranged along the propagation direction of the neutrons at the back side of the moderator/target structure.

10. A method of using an article according to claim 1 to perform neutron activation of the article comprising moderators and targets on an industrial scale with increased neutron thermalization, the method comprising:

providing neutrons to complete the neutron activation through various decay/activation schemes;

arranging the article in a propagation path of neutrons;

irradiating the article with the neutrons, completing thereby neutron activation of the article, wherein the article is provided as a single unit comprising at least two moderators and at least two targets arranged in an alternating manner along the propagation direction of said neutrons, wherein each of the moderators and each of the targets is canned or put into a cassette separately and wherein each of said moderators is made of a substance that shifts the energy of at least a portion of the incident neutrons initially provided into a thermal energy range so as to maximize the number of thermal neutrons used for the neutron activation, and wherein individual ones of the targets comprise at least one substance to be converted/transmuted through various decay/activation schemes.

11. The method according to claim 10, wherein the step of irradiating said structure is performed with an applied flux of thermal neutrons of $1*10^{14}$ n/cm²/s.

12. The method according to claim 10, wherein the providing the neutrons comprises providing the neutrons from an active core of a nuclear reactor provided with a reactor shell.

13. The method according to claim 12, further comprising arranging the article outside of the reactor shell.

* * * * *